US009179412B2

(12) United States Patent
Kang et al.

(10) Patent No.: US 9,179,412 B2
(45) Date of Patent: Nov. 3, 2015

(54) APPARATUS AND METHOD FOR RECEIVING CONTENT IN TERMINAL

(71) Applicant: Samsung Electronics Co., Ltd., Gyeonggi-do (KR)

(72) Inventors: Hyuk Kang, Gyeonggi-do (KR); Hyeong-Seok Kim, Seoul (KR); Hyun-Chul Choi, Seoul (KR)

(73) Assignee: Samsung Electronics Co., Ltd., Yeongtong gu, Suwon-si, Gyeonggi-do (KR)

( * ) Notice: Subject to any disclaimer, the term of this patent is extended or adjusted under 35 U.S.C. 154(b) by 15 days.

(21) Appl. No.: 14/096,213

(22) Filed: Dec. 4, 2013

(65) Prior Publication Data
US 2014/0179233 A1   Jun. 26, 2014

(30) Foreign Application Priority Data
Dec. 4, 2012   (KR) .......... 10-2012-0139862

(51) Int. Cl.
| H04B 7/00 | (2006.01) |
| H04W 52/02 | (2009.01) |
| H04L 29/08 | (2006.01) |
| H04W 4/00 | (2009.01) |
| H04W 4/06 | (2009.01) |
| H04W 4/18 | (2009.01) |
| H04W 8/00 | (2009.01) |
| H04W 4/20 | (2009.01) |

(52) U.S. Cl.
CPC ........... *H04W 52/0261* (2013.01); *H04L 67/16* (2013.01); *H04W 4/008* (2013.01); *H04W 4/06* (2013.01); *H04W 4/18* (2013.01); *H04W 8/005* (2013.01); *H04W 4/206* (2013.01)

(58) Field of Classification Search
CPC .................................................. G06Q 30/0277
USPC .................. 455/41.1, 41.2, 68, 434, 438, 522
See application file for complete search history.

(56) References Cited

U.S. PATENT DOCUMENTS

| 7,218,941 | B1 | 5/2007 | Kubo et al. |
| 8,737,917 | B2 * | 5/2014 | Desai et al. .................. 455/41.2 |
| 2008/0109302 | A1 | 5/2008 | Salokannel et al. |
| 2011/0021142 | A1 | 1/2011 | Desai et al. |

FOREIGN PATENT DOCUMENTS

EP   2 317 726 A1   5/2011

OTHER PUBLICATIONS 4.1.2 LE Topology & 4.2.2 LE Procedures, Bluetooth Specification Version 4.0, Jun. 30, 2010, pp. 75 and 80-83, vol. 1.
11 Advertising and Scan Response Data Format, Bluetooth Specification Version 4.0, Jun. 30, 2010, pp. 375-390, vol. 3.
3 Advertising State to 6 Connection State, Bluetooth Specification Version 4.0, Jun. 30, 2010, pp. 104-117, vol. 6.

* cited by examiner

Primary Examiner — Tuan H Nguyen
(74) Attorney, Agent, or Firm — Cha & Reiter, LLC.

(57) ABSTRACT

An apparatus and a method for receiving content in a terminal, by which the terminal can receive, with low power consumption, content from an adjacent service provider by using a wireless communication technology. A low-power short-range communication unit; and a controller for controlling the low-power short-range communication unit to broadcast an advertising packet including information of the terminal at regular intervals, and control the low-power short-range communication unit so as to connect to a particular service provider which has scanned the advertising packet. A control operation is then performed so as to receive content from the particular service provider.

30 Claims, 6 Drawing Sheets

APPARATUS AND METHOD FOR RECEIVING CONTENT IN TERMINAL

CLAIM OF PRIORITY

This application claims the benefit of priority under 35 U.S.C. §119(a) from Korean Patent Application Serial No. 10-2012-0139862, which was filed in the Korean Intellectual Property Office on Dec. 4, 2012, the entire content of which is hereby incorporated by reference in its entirety.

BACKGROUND

1. Technical Field

The present disclosure relates generally to an apparatus and a method for receiving different types of content in a portable terminal. More particularly, the present disclosure relates to an apparatus and a method for receiving content in a terminal and issues with current consumption associated with receiving a beacon packet broadcasted by an AP.

2. Description of the Related Art

Recently, methods are being introduced for additionally including information in a beacon packet about local stores or other information in the beacon packet when transmitting the beacon packet by a Wi-Fi Access Point (AP), and delivering the information to users of Wi-Fi terminals. However, in order to receive the information in a seamless method, a user must perform an AP scan operation in a state of always turning on Wi-Fi power. Accordingly, a problem arises in that current consumption of the user devices increases from the additional transmissions of information.

A Wi-Fi AP that is located in a public place, such as a coffee shop or a restaurant, can includes in a transmitted beacon packet marketing information that is useful to the user in vicinity of the particular public place. Therefore, the AP can broadcast the beacon packet including the marketing information.

However, in order to receive the marketing information (e.g. advertisements) in the beacon packet, the user must enable Wi-Fi, and must perform a scan operation. Wi-Fi has a high current consumption during a scan operation due to the technological characteristics thereof. In the case of causing a cycle of the scan operation to be longer in order to reduce the current consumption, there can occur a situation in which the user cannot receive a beacon packet broadcasted by an AP located at a store while the user is in motion.

SUMMARY

Accordingly, an aspect of the present invention provides an apparatus and a method for receiving content in a terminal, by which the terminal can receive, with low power consumption, content from an adjacent service provider by using a wireless communication technology.

Also, another aspect of the present invention provides an apparatus and a method for receiving content in a terminal, by which the terminal continuously broadcasts an advertising packet including information of the terminal through a low-power short-range communication unit and thereby can receive content from an adjacent service provider.

In order to achieve the aspects t of the present invention, an apparatus for receiving content in a terminal is provided. Typically, the terminal would be a portable terminal, such as a terminal that has somewhat limited power consumption because of batteries, but is not limited to such types of terminals or a particular power source. The apparatus can include: a low-power short-range communication unit; and a controller for controlling the low-power short-range communication unit so as to broadcast an advertising packet including information of the terminal at regular intervals, controlling the low-power short-range communication unit for connection with a particular service provider which has scanned the advertising packet, and performing a control operation for receiving content from the particular service provider.

In accordance with another aspect of the present invention, a method for receiving content in a terminal is provided. The method can include: broadcasting an advertising packet including information of the terminal at regular intervals by a low-power short-range communication unit; and receiving content from the particular service provider when a connection to a particular service provider which has scanned the advertising packet is made by the low-power short-range communication unit.

BRIEF DESCRIPTION OF THE DRAWINGS

The above and other exemplary aspects, and advantages of the present invention will become more apparent to a person of ordinary skill in the art from the following detailed description taken in conjunction with the accompanying drawings, in which.

DETAILED DESCRIPTION

Figure 1:
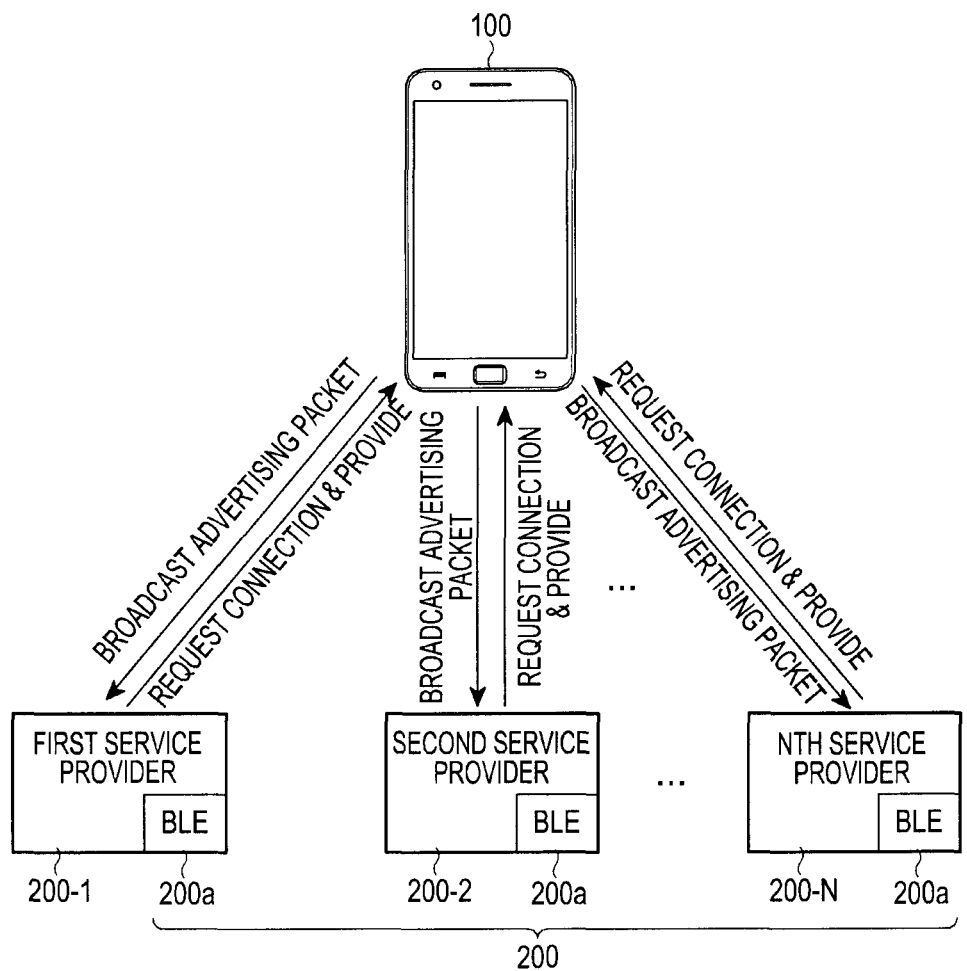
FIG. 1 is an overview of a system for providing content according to an exemplary embodiment of the present invention.

Hereinafter, exemplary embodiments of the present invention will be described in more detail with reference to the accompanying drawings. It should be noted that in the accompanying drawings, the same elements will be designated by the same reference numerals as far as possible although they are shown in different drawings.

Terminals according to an exemplary embodiment of the present invention include many types, such as a portable terminal and a fixed terminal. In this case, portable terminals, which are electronic devices portable so as to be easily carried, may include a video phone, a mobile phone, a smart phone, an IMT-2000 (International Mobile Telecommunication 2000) terminal, a WCDMA (Wideband Code Division Multiple Access) terminal, a UMTS (Universal Mobile Telecommunication Service) terminal, a PDA (Personal Digital Assistant), a PMP (Portable Multimedia Player), a DMB (Digital Multimedia Broadcasting) terminal, an e-book, portable computers (e.g. a laptop, a tablet PC, etc.), a digital camera, tablet, phablet, wearable computing devices, etc. On the other hand, the fixed terminal may be a desktop personal computer or the like, just to name a non-limiting possibilities.

FIG. 1 is a view showing a system for providing content according to an exemplary embodiment of the present invention.

Referring now to FIG. 1, a terminal 100 which is an advertiser (e.g. provides advertising), broadcasts an advertising packet including information regarding a terminal to multiple service providers 200 through a low-power short-range communication unit. Then, when a particular service provider which scans the broadcasted advertising packet from among the multiple service providers 200-1, 200-2, 200-N requests a connection between itself and the terminal 100, the terminal 100 connects to the particular service provider 200-1, 200-2, 200-N through the low-power short-range communication unit, and receives and displays content from the particular service provider. The terminal 100 will be described in detail with reference to FIG. 2.

Each of the multiple service providers 200-1, 200-2, 200-N includes a low-power short-range communication unit 200a. When each of the multiple service providers 200-1, 200-2, 200-N scans the advertising packet broadcasted by the terminal 100, each of the multiple service providers 200-1, 200-2, 200-N requests the terminal to connect to itself. When each of the multiple service providers 200-1, 200-2, 200-N receives a connection response from the terminal 100, the particular multiple service provider connects to the terminal 100 through the low-power short-range communication unit 200a, and transmits content. The low-power short range communication device can include but is not limited to, for example, a Bluetooth Low Energy (BLE) device.

When each of the multiple service providers 200-1, 200-2, 200-N, scans the advertising packet broadcasted by the terminal 100, the multiple authentication service providers can each request an authentication server to authenticate the terminal. At this time, each of the multiple service providers 200-1, 200-2, 200-N may transmit a random device address or a public device address included in the advertising packet of the terminal to the authentication server, and may request the authentication server to authenticate the terminal. When the authentication server completes the authentication of the terminal 100, each of the multiple service providers 200-1, 200-2, 200-N can request connection with the terminal 100. When each of the multiple service providers 200 receives the connection response from the terminal, the multiple service providers can connect to the terminal through the low-power short-range communication unit, and transmits the content to the terminal.

Also, each of the multiple service providers 200-1, 200-2, 200-N can include an address list including authenticated addresses. Accordingly, each of the multiple service providers 200-1, 200-2, 200-N can ignore an advertising packet from a terminal having an address which is not included in the address list.

In the address list, a random device address or a public device address may be used as an authenticated address. In a white list included in the address list, a random device address is used as an authenticated address.

The term "public device address" refers to, for example, an address, such as a Company ID or a MAC address, of a terminal. The term "random device address" refers to an address given by the authentication server.

Each of the multiple service providers 200-1, 200-2, 200-N is not limited in way to a terminal, and may comprise not only an AP (Access Point), a TV, a PC and a tablet or phablet, but also can include all types of apparatuses that include a low-power short-range communication unit, for example, a BLE (Bluetooth Low Energy) device.

Table 1 herein below shows scanning parameters used when each of the multiple service providers 200-1, 200-2, 200-N performs a scan operation for scanning the terminal 100.

TABLE 1

| Set scan command parameters | Definition |
| --- | --- |
| LE_Scan_Type | (0x00) PassiveScanning (default) |
|  | (0x01) ActiveScanning (SCAN_REQ) |
| LE_Scan_Inteval | Range: 2.5 ms~10.24 s (default 10 ms) |
| LE_Scan_Window | Range: 2.5 ms~10.24 s (default 10 ms) |
| Own_Address_Type | Public (default) or RandomDeviceAddress |
| Scanning_Filter_Policy | (0x00) Accept all advertisement packets (default). |
|  | (0x01) Ignore advertisement packets from devices not in the WhiteList Only. |

Figure 2:
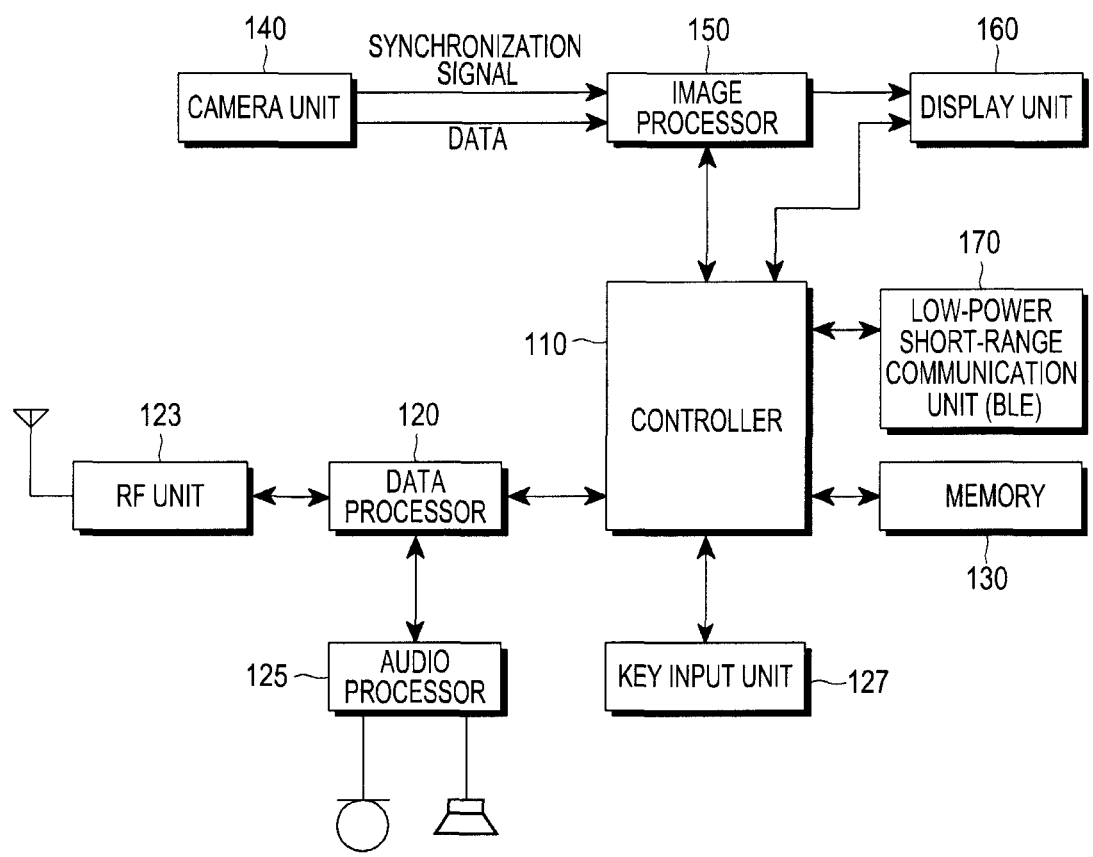
FIG. 2 is a block diagram showing an exemplary configuration of a terminal according to an exemplary embodiment of the present invention.
Figure 3:
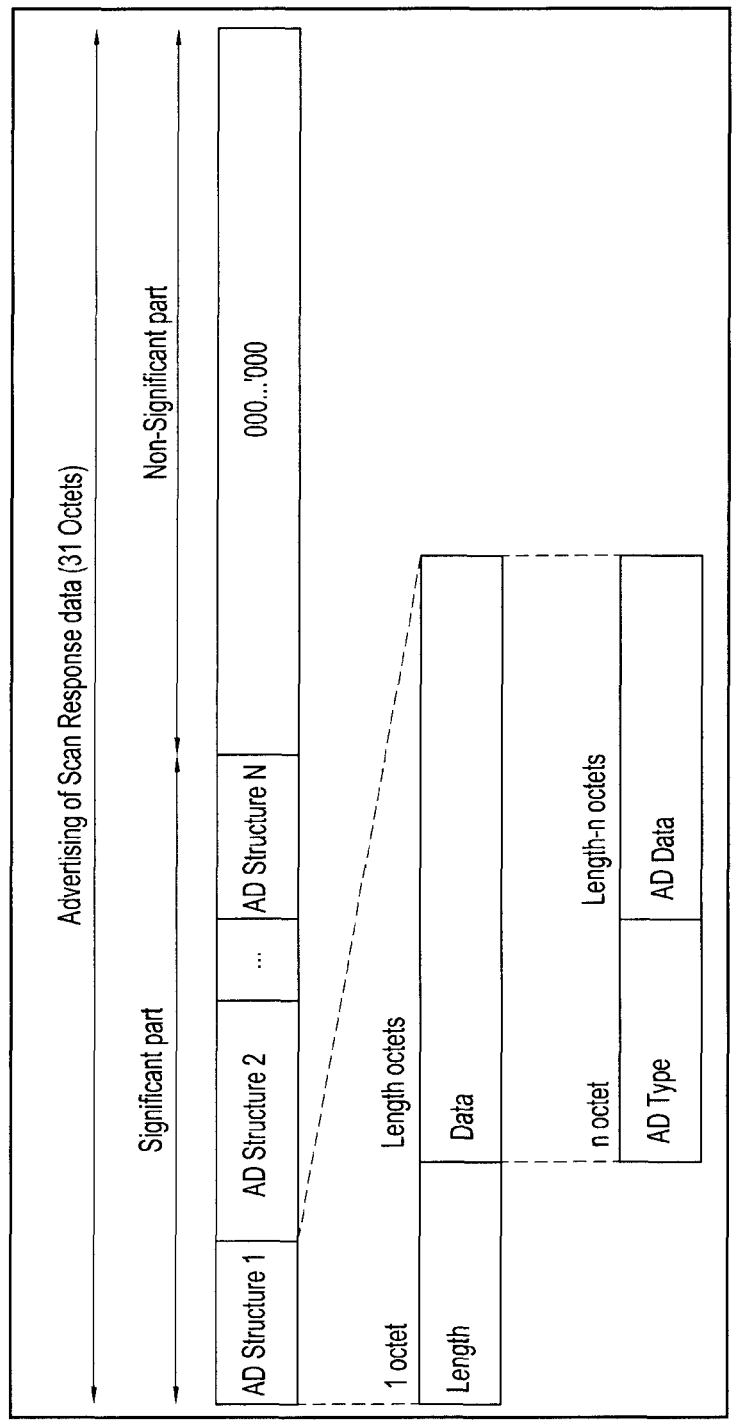
FIG. 3 shows exemplary format of an advertising package broadcasted by a terminal according to an exemplary embodiment of the present invention.

FIG. 2 is a block diagram showing exemplary configuration of a terminal according to an exemplary embodiment of the present invention. FIG. 3 shows an exemplary format of an advertising package broadcasted by a terminal according to an exemplary embodiment of the present invention.

Referring now to FIG. 2, an RF unit 123 performs a wireless communication function of the terminal. The RF unit 123 comprises hardware including an RF transmitter for upconverting the frequency of a signal to be transmitted and then amplifying the frequency-upconverted signal, an RF receiver for low-noise amplifying a received signal and then down-converting the frequency of the low-noise amplified signal, etc. A data processor 120 includes hardware, such as a transmitter for encoding and modulating a signal to be transmitted, a receiver for demodulating and decoding a signal received by the RF unit 123, etc. Namely, the data processor 120 may include a modem (modulator/demodulator) and a codec (coder/decoder). In this case, the codec includes a data codec for processing packet data and the like, and an audio codec for processing audio signals including voice and the like. An audio processor 125 reproduces a received audio signal, which has been output from the audio codec of the data processor 120, or transmits an audio signal to be transmitted, which is generated from a microphone, to the audio codec of the data processor 120. All of the components in FIG. 2 comprise or are tied to hardware for operation, as the claimed invention constitutes statutory subject matter and does not constitute pure software or software per se. A key input unit 127 may include real or virtual keys (a touchpad, for example) for inputting numbers and text information and function keys for setting various functions.

A memory 130 is a non-transitory memory and may be apportioned to include a program memory and a data memory, or there can be separate memories for each. The program memory stores machine executable code for controlling a general operation of the terminal, or application of a function. Also, the program memory can store machine executable code which controls a low-power short-range communication unit that periodically broadcasts an advertising package including information of a terminal and so as to receive content from an adjacent service provider in response to broadcasting of the advertising package according to an exemplary embodiment of the present invention. Also, the data memory temporarily stores data generated while the programs are performed.

Also, the memory 130 can store content received from each of the multiple service providers 200 according to an exemplary embodiment of the present invention, and the content is provided in the form of a message. The message includes, for example, at least one of text, multimedia data, a URL address, and a particular command for performing a particular instruction.

A controller 110 controls an overall operation of the terminal.

The controller 110, which comprises hardware such as a processor or microprocessor controls the low-power short-range communication unit 170 to broadcast continuously an advertising packet including information of the terminal. At this time, the term "advertising packet" refers to an advertising packet of a BLE (Bluetooth Low Energy) device corresponding to the low-power short-range communication unit 170.

FIG. 3 illustrates an exemplary format of an advertising package continuously broadcasted by the terminal 100, and shows an example of an advertising package in this particularly exemplary case that has a length of 31 bytes. Also, Table 2 below shows the types of data, namely, information of the terminal, stored in a data field of 31 bytes in the exemplary format of the advertising packet as shown in FIG. 3.

TABLE 2

| AD type | Byte | Use | Example of practice |
|---|---|---|---|
| TX power level | 1 | Measurement of certain distance (signal strength) pathloss = TXPL − Adv_RSSI | TX power level = +4 (dBm) RSSI on advpacket = −60 (dBm) passloss = +65 dB |
| Shortened local name | 29 ↓ | Broadcast name or Msg | Can be replaced by a scan response ex) GT-N8000 and SamsungMobile |
| Class of device (Cod) | 3 | MajorServiceClass MinorDeviceClass ServiceClass (24-bit mask) | ex) CoD = Major: Phone Minor: Smartphone Service: ObjectTransfer |
| Random target address | 6 | 48-bit address | ex) Use of a predefined address, such as SamsungMobile or Starbucks |
| List of service solicitation UUID | 2 ↑ | May be sent to invite | ex) 0x1105 <<ObjectPushProfile>> 0x1106 <<FileTransferProfile>> |
| Manufacturer specific data <<Protocol>> Manufacturer specific data <<others>> | 4 | Company identifier code and Protocol identifier code | (0x0075) Samsung Electronics (0x0201) SSSP1.1 |

A TX power level, a Shortened local name, a Class of device (Cod), a Random target address and a List of service which are shown in Table 2 are stored in a Significant part shown in FIG. 3. Manufacturer specific data shown in Table 2 is stored in a Non-significant part shown in FIG. 3.

In Table 2, the Random target address, for example, represents an address given by the authentication server. Also, in the Table 2, the Manufacturer specific data is an extra field, and a Company ID and a Protocol ID, as public device addresses are stored in a Manufacturer specific data <<Protocol>>. Data for other purposes may be stored in a Manufacturer specific data <<others>>.

Also, according to an exemplary embodiment of the present invention, when the terminal is in a "sleep" state, the controller 110 performs a control operation for broadcasting the advertising packet at intervals equal to or greater than a threshold. When the terminal is in a moving state, the controller 110 performs a control operation for broadcasting the advertising packet at intervals less than the threshold. As a result, the controller 110 may dynamically adjust a broadcasting interval according to a detected state.

Accordingly, even when the terminal 100 enters the sleep state, the controller 110 performs a control operation so as to perform broadcasting at regular intervals, and enables the terminal to respond to a connection request from a particular service provider.

According to an exemplary embodiment of the present invention, when the particular service provider which has scanned the advertising packet requests a connection with the terminal 100, the controller 110 performs a control operation for transmitting a connection response to the particular service provider, controls the low-power short-range communication unit 170 so as to connect to the particular service provider, and performs a control operation for receiving content from the particular service provider.

Prior to the advertising packet being transmitted, the controller 110 may configure an address list including authenticated addresses. Accordingly, the controller 110 may ignore a connection request from a service provider having an address which is not included in the address list due to previously configuring the address list that did not include the particular service provider making the connection request.

In the address list, a random device address or a public device address may be used as an authenticated address. In a white list included in the address list, a random device address is used as an authenticated address.

The term "public device address" refers to an address, such as a Company ID or a MAC address of a terminal, and the term "random device address" refers to an address given by the authentication server.

Authenticated addresses managed in the address list may be utilized as addresses of various service providers, such as shown in the examples of Table 3 below.

TABLE 3

| Service provider | Definition |
|---|---|
| DeviceServiceProvider | provides an address for authentication between devices all using an identical protocol. ex) SmartPhone, SmartTV and SmartAppliance |
| BusinessServiceProvider | A BSP for each industry provides an address in order to provide services, such as an advertisement, a coupon, an order and a ticket. ex) Starbucks, SKEnergy, Costco, CGV, KORAIL, etc. |
| SocialServiceProvider | provides an address for authentication to persons who use a particular SNS, or a particular person. ex) an SNS such as Facebook or Twitter |

Otherwise, if authenticated addresses managed in the address list are not utilized as addresses of various service providers or the address of a typical service provider is not listed, the controller 110 performs a control operation for transmitting an address of the particular service provider that has requested a connection with the terminal, to a separate authentication server while simultaneously requesting the separate authentication server to authenticate the particular service provider. When the authentication server completes the authentication of the particular service provider, the controller 110 performs a control operation for transmitting a connection response to the particular service provider, and controls the low-power short-range communication unit 170 to connect to the particular service provider that made the connection request.

When content is received from the particular service provider, the controller 110 may perform, in stages, an advertising method according to a user's particular settings. According to the user's particular settings, the received content may be displayed or may not be displayed by a display unit 160. When the received content is set to be displayed by the display unit 160, the content may be displayed in the form of a pop-up even in a state of turning off an LCD, or the content may be displayed in the form of ticker notification on an indication bar of the terminal. Also, the received content may be sequenced according to priority based on a particular condition.

The controller 110 performs a control operation for providing content, which is received from the particular service provider, in the form of a message. The message includes, for example at least one of text, multimedia data, a URL address, and a particular command for performing a particular instruction. Table 4 below shows exemplary items that can be included in the message.

TABLE 4

| Message type | Byte | Mode |
| --- | --- | --- |
| ScannerID | 6 | Scanner address |
| MessageID | 2 | 16-bit message UUID |

TABLE 4-continued

| Message type | Byte | Mode |
| --- | --- | --- |
| Body | 256 ↑ | includes<br><Text></Text>: message body<br><MM></MM>: multimedia<br><URL></URL>: URL address<br><Cmd></Cmd>: particular Cmd<br>and the like. |
| Reference count | 1 | The number of times of a user's reference |
| Priority | 1 | Importance allowing for a ScannerID, Message characteristics and a Reference count. |

The priority of relevant content may be determined by using a Body item, a Reference count item and a Priority item which are shown in Table 4.

At least one of the contents of a message, multimedia data, a URL address and a particular command is stored in the Body item shown herein above in Table 4.

Table 5 herein below shows an example of contents, multimedia data, a URL address and a particular command, which may be stored in the Body item of the message.

TABLE 5

| Message category | Data type | Body sample | Example |
| --- | --- | --- | --- |
| LE_Msg_Marketing | announcement<br>price information<br>event information<br>coupon<br>facilities guide<br>location guide<br>schedule guide<br>personal introduction<br>reservation URL<br>menu URL<br>order URL | TextOnly<br>TextOlny<br>Text + URL<br>Text + QR codeImage<br>Text + IndoorMapImage<br>Text + POI<br>Text + vCalendar<br>Text + vCard<br>Text + URL<br>Text + URL<br>Text + URL | Evacuation guide and finding missing children<br>Gas station (price of gasoline and that of diesel)<br>Supermarket (food 1 + 1 event)<br>Department store and convenience store (10% coupon)<br>Emergency exit guide in museum or movie theater<br>Fire evacuation guide<br>Conference notice<br>Politician and tout<br>Bank number ticket<br>Cafe and fast-food restaurant<br>Restaurant |
| LE_Msg_Traffic | traffic volume<br>traffic light<br>current station information<br>departure information | Text + URL<br>Text + POI<br>Text + POI<br>Text + IndoorMapImage | Highway traffic volume (camera)<br>Change of traffic light<br>Current station information in subway or train<br>Delayed arrival guide |
| LE_Msg_Device | multimedia information<br>broadcast information<br>car services<br>personalized services<br>home appliance services | Text + URL<br>Text + URL<br>Text + Cmd<br>Text + Cmd<br>Text + URL | Information on music or movie being reproduced<br>TV/radio broadcast information<br>Car kit connection<br>Close user environment for tablet, PC, etc.<br>Access to management screen of home appliance |
| LE_Msg_Apps | friend notification | Text + URL | Smart phone |

When content received from the particular service provider is identical to the previously-received content, the controller 110 may determine whether the content received from the particular service provider is repeated content (previously received), and may not store the relevant content in the memory 130.

After the content is received from the particular service provider, the controller 110 of terminal 100 releases the connection between the terminal 100 and the particular service provider (for example 200-1, 200-2 or 200-N), and again continuously broadcasts the advertising packet including the information of the terminal 100.

In another exemplary embodiment of the present invention, an exemplary case is discussed here where the terminal 100 broadcasts the advertising packet at regular intervals. However, the terminal 100 may set a particular condition, and may broadcast the advertising packet according to the particular set condition (for example, ringtone mode).

Also, the controller 110 of terminal 100 adds, to a blacklist, a particular service provider which requests a connection with the terminal 100, the number of times of which is equal to or greater than a predetermined value, for a predetermined time period, and ignores a connection request during the predetermined time period. The reason for ignoring the connect request for a predetermined time period is to reduce a consumption of current, and to secure privacy to prevent indiscriminately waking up the terminal.

With continued reference to FIG. 2, a camera unit 140 includes hardware such as a camera sensor for capturing image data and converting the captured light signal to an electrical signal, and a signal processor for converting the analog image signal that has been captured by the camera sensor, into digital data. In this case, it is assumed that the camera sensor comprises a Charge-Coupled Device (CCD) sensor or a Complementary Metal-Oxide Semiconductor (CMOS) sensor, and the signal processor may be implemented by using a Digital Signal Processor. (DSP) Also, the camera sensor and the signal processor may be implemented as one unit, or may be implemented as separate elements.

An image processor 150 performs Image Signal Processing (ISP) for displaying an image signal, which has been output from the camera unit 140, on the display unit 160. In this case, the term "ISP" refers to the execution of functions including a gamma correction, an interpolation, a spatial change, an image effect, an image scale, AWB (Auto White Balance), AE (Auto Exposure), AF (Auto Focus), etc. Accordingly, the image processor 150 processes the image signal, which has been output from the camera unit 140, on a frame-by-frame basis, and outputs the frame image data in such a manner as to meet the characteristics and the size of the display unit 160. Also, the image processor 150 includes an image codec, and compresses the frame image data displayed on the display unit 160 in a set scheme, or restores the compressed frame image data to an original frame image data. In this case, the image codec may be implemented by using either a JPEG (Joint Photographic Coding Experts Group) codec, an MPEG-4 (Moving Picture Experts Group-4) codec, a Wavelet codec, or the like. It is assumed that the image processor 150 includes an OSD (On-Screen Display) function. The image processor 150 may output on-screen display data according to the size of a screen displayed under the control of the controller 110.

The display unit 160 displays an image signal, which is output by the image processor 150, on a screen, and displays user data which is output by the controller 110. In this case, the display unit 160 preferably comprises a Liquid Crystal Display (LCD), and thus may include an LCD controller, a memory capable of storing image data, an LCD display element, etc., and it is within the scope of the invention that OLED, AMOLED, LED, etc. or other types of display technology can be used. When the LCD employs a touch screen, the display unit 160 may operate as an input unit. At this time, the display unit 160 may display keys which are identical to those of the key input unit 127. An artisan should understand and appreciate that other types of thin film technology (TFT) displays can be used.

Also, when the display unit 160 employs the touch screen and thus is used as a touch screen unit, the touch screen unit includes a Touch Screen Panel (TSP) including multiple sensor panels. The multiple sensor panels may include, for example, a capacitive/electrostatic sensor panel capable of recognizing a user's finger touch and an electromagnetic sensor panel capable of sensing a delicate touch, such as a touch of a stylus. Virtually any other type of touch screen technology can be employed with the present invention. In addition, for purposes of the application and claims "touch" does not literally require physical contact to be sensed by the TSP and bringing a finger or a stylus within a predetermined distance of the screen without making physical contact can be employed by the artisan.

The low-power short-range communication unit 170 is implemented by using a short-range wireless communication technology, in which a transmission speed is low but the amount of power consumption can be reduced, and in this example refers to a BLE (Bluetooth Low Energy) device. However, other short-range wireless protocols that consume low power can be used. In an exemplary embodiment of the present invention, the terminal (advertiser) may continuously broadcast the advertising packet including the information of the terminal through the low-power BLE 170 even in the sleep state. Also, the terminal may connect to the particular service provider, which has scanned the advertising packet, through the BLE 170, and may receive various contents.

In an exemplary embodiment of the present invention, only the BLE device is described as the low-power short-range communication unit 170 which broadcasts the advertising packet. However, examples of the short-range wireless communication units, each included in the terminal 110 may include a Bluetooth device, a ZIGBEE device, a WLAN device, an ANT device and an NFC/RFID device, as well as the BLE device. Also, the terminal 110 may include sensors, such as a GPS, an accelerometer, a gyroscope, a geomagnetic sensor and a pressure sensor.

An operation of the terminal as described above for receiving content will now be described in detail below with reference to FIG. 4 through FIG. 6.

Figure 4:
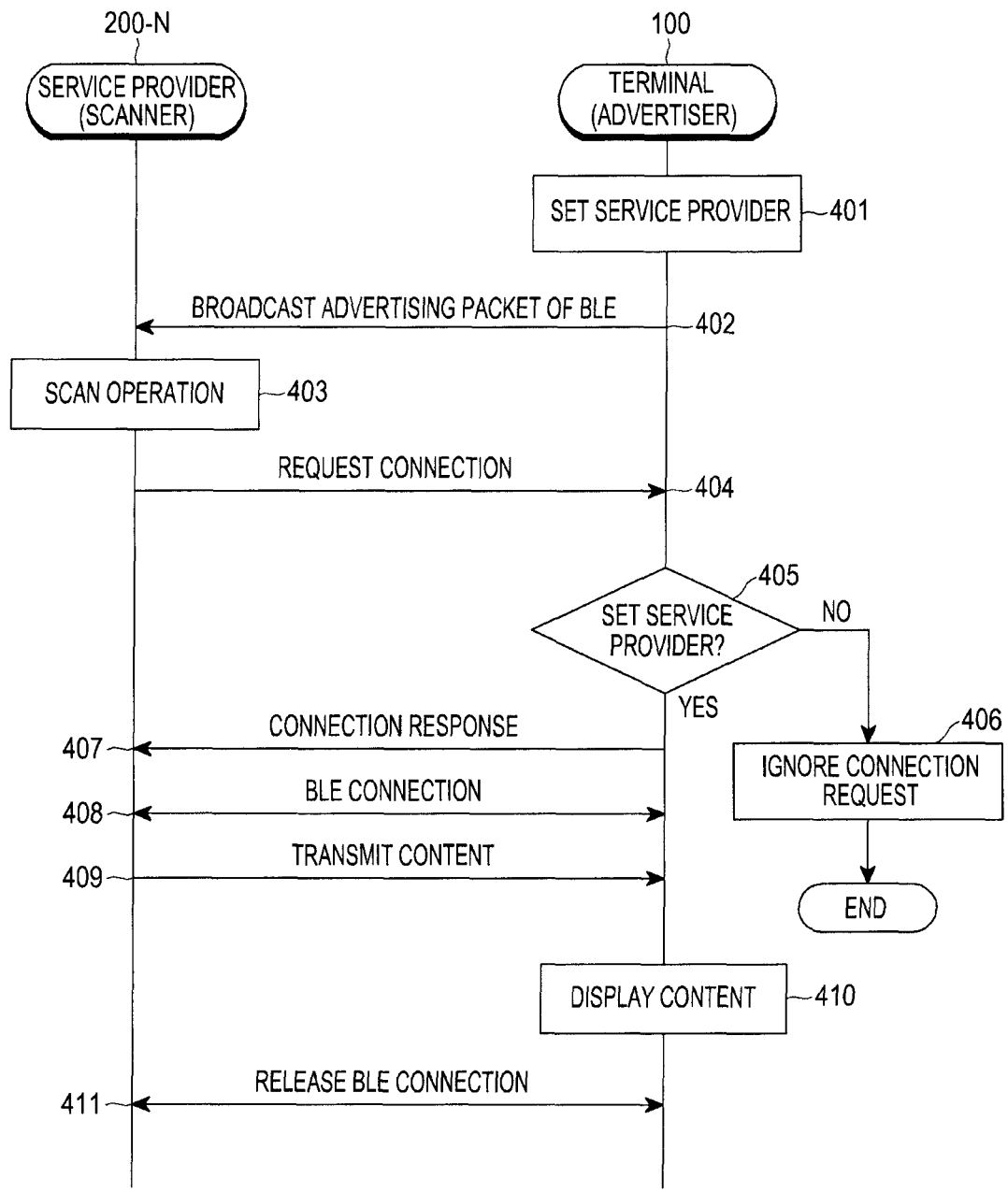
FIG. 4 is a flowchart showing exemplary operation of a process for receiving content by a terminal, according to a first exemplary embodiment of the present invention.

FIG. 4 is a flowchart showing exemplary operation of a process for receiving content by a terminal, according to a first exemplary embodiment of the present invention.

Hereinafter, an exemplary embodiment of the present invention will now be described in detail with reference to FIG. 1 through FIG. 3.

Referring now to FIG. 4, in step 401, the controller 110 preferably has previously set a service provider of the terminal 100, and configures an address list including authenticated addresses, from which a connection request from any of the authenticated address received by the controller 110 of the terminal 100 will be granted.

Then, at 402, the controller 110 continuously broadcasts at regular intervals an advertising packet of the BLE device including information of the terminal 100, through the short range communication unit 170.

When a particular service provider "200-N" from among the multiple service providers 200-1, 200-2, 200-N scans the advertising packet broadcasted by the terminal 100 while performing a scan operation in step 403, the particular service provider 200-N then performs step 404, by sending a request for a BLE connection to the terminal 100 by a service provider BLE 200a.

Prior to sending the request for connection, the particular service provider 200-N identifies whether an address of the terminal 100 is included in a previously-configured address list as an authenticated address. Only when the address of the terminal is included in the address list, the particular service provider 200-N may send a request for a BLE connection via service provider BLE 200a to the terminal 100. The address list that the particular service provider 200-N has, may comprise a white list including a random device address received from an authentication server.

Note that, as shown in the FIG. 4, each of the terminal and the service provider previously comprises the address list including the authentication address, for example, each of the terminal and the service provider previously comprises the white list including a random device address received from the authentication server as the address list. Therefore, the particular service provider does not receive the configured address list from the controller of the terminal 100 and check whether the address of the terminal is included on the previously configured address list.

When at 404 the terminal 100 receives the connection request from the particular service provider 200-N, the controller 110 of the terminal 100 then identifies at 405 whether an address of the particular service provider 200-N is included in the previously-configured address list as an authenticated address.

In other words, at 405, when the address of the particular service provider 200-N is not included in the address list, meaning the controller 110 determines the address of the particular service provider 200-N is not included in the address list. In this case the controller 110 performs step 406, which is to ignore the connection request from the particular service provider 200-N. The address list used by the terminal 100 may comprise a white list including a random device address given by the authentication server.

However, when at 405 the controller 110 determines that the address of the particular service provider 200-N is included in the address list, the controller 110 performs step 407, in which it responds to the connection request from the particular service provider 200-N by sending a connection response. According to the connection response send by the terminal 100 in response to the connection request received at step 404, the particular service provider 200-N and the terminal 100 perform step 408, in which a BLE communication is connected between the particular service provider 200-N and the terminal 100.

When at 408 the BLE communication is connected between the particular service provider 200-N and the terminal 100 before a data channel is established, then at step 409 the particular service provider 200-N transmits content to the terminal 100.

After the content is transmitted from the service provider 200-N to the terminal 100, the terminal performs step 410 by displaying the received content according to a user's setting.

When the terminal 100 receives the content, at step 411, the particular service provider 200-N and the terminal 100 release the BLE connection therebetween.

The controller 110 of the terminal 100, after having released the BLE connection between the terminal 100 and the particular service provider 200-N, can then again perform step 402, in which it again broadcasts the advertising packet including the information of the terminal.

Figure 5:
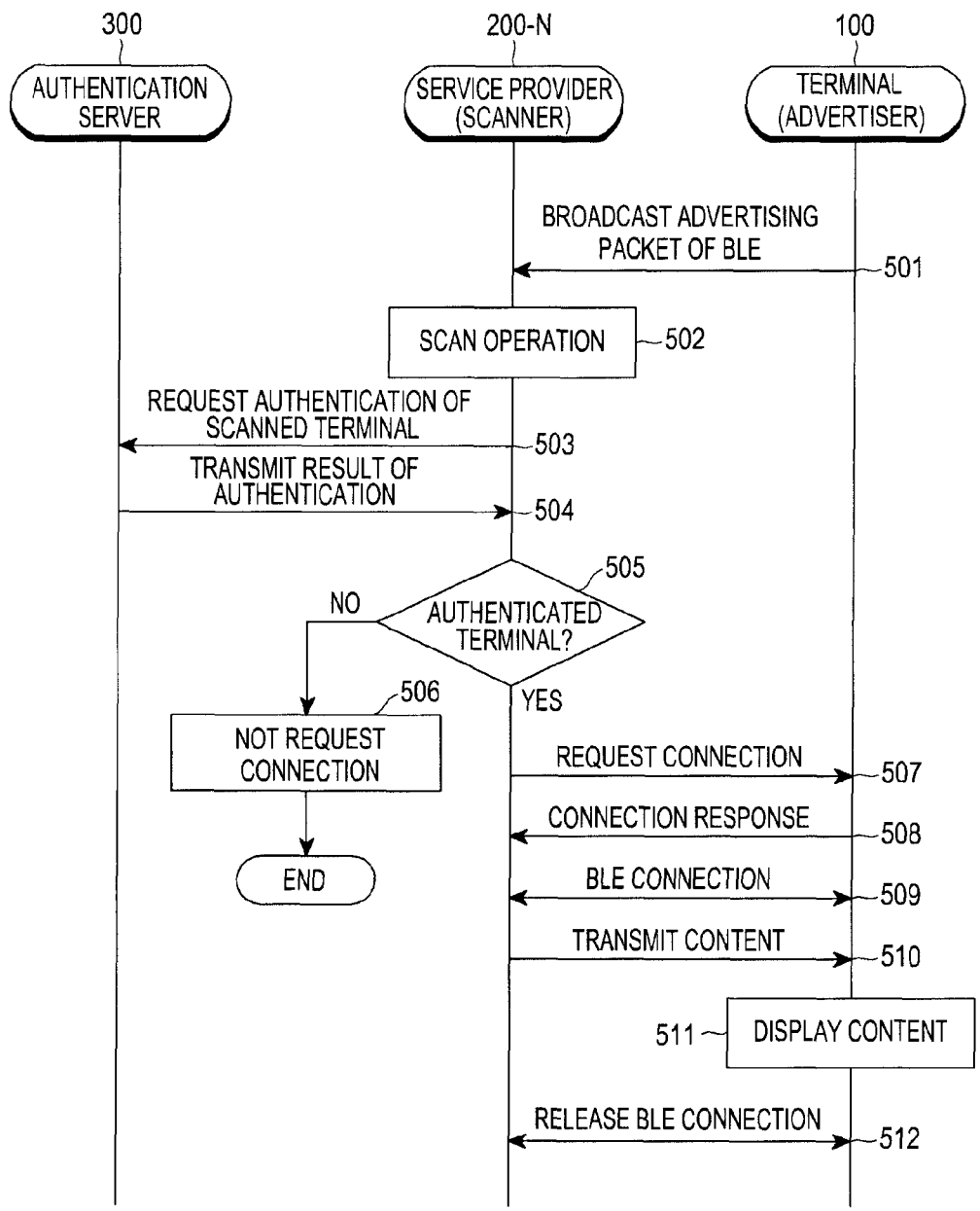
FIG. 5 is a flowchart showing exemplary operation of a process for receiving content by a terminal, according to a second exemplary embodiment of the present invention.

FIG. 5 is a flowchart showing an exemplary operational process for receiving content by a terminal, according to a second exemplary embodiment of the present invention.

Hereinafter, an exemplary embodiment of the present invention will be described in detail with reference to FIG. 1 through FIG. 3.

Referring now to FIG. 5, at step 501 the controller 110 of the terminal 100 continuously broadcasts at regular intervals an advertising packet of the BLE device including information of the terminal, through the BLE device 170.

When at step 502 a particular service provider 200-N from among the multiple service providers 200-1, 200-2, 200-N, etc., scans the advertising packet broadcasted by the terminal 100 while performing a scan operation.

Then at step 503 the particular service provider 200-N transmits an address of the terminal to an authentication server 300 while simultaneously requesting the authentication server 300 to authenticate the terminal. The address of the terminal transmitted to the authentication server 300 may comprise the random device address or the public device address.

At step 504, the particular service provider 200-N receives a result of the authentication from the authentication server 300. When the result of the authentication from the authentication server 300 shows that the address of the terminal is not an authenticated address, the particular service provider 200-N determines in step 505, that the address of the terminal is not an authenticated address, and performs step 506, in which it does not request the terminal to connect to the particular service provider 200-N. However, when at step 505 the result of the authentication shows that the address of the terminal is determined to be an authenticated address, the particular service provider 200-N having determined in step 505, that the address of the terminal is an authenticated address, and the performs step 507, in which the particular service provider 200-N requests connection with the terminal 100.

When the terminal 100 receives the connection request from the particular service provider 200-N, the controller 110 of the terminal 100 performs step 508 by responding to the connection request from the particular service provider 200-N.

According to the connection response made by the terminal 100 in response to the connection request, the particular service provider 200-N and the terminal 100 then perform step 509, in which BLE communication is connected between the particular service provider 200-N and the terminal 100.

When the BLE communication is connected between the particular service provider 200-N and the terminal 100 before a data channel is established, then at step 510 the particular service provider 200-N transmits content to the terminal 100. Next, the terminal performs step 511 by displaying the received content according to a user's setting.

When the terminal 100 receives the content, the particular service provider 200-N and the terminal 100 perform step 512, in which the particular service provider 200-N and the terminal 100 release the BLE connection there between.

The controller 110 of the terminal 100 which has released the BLE connection between the terminal 100 and the particular service provider 200-N, then again performs step 501, in which the terminal 100 again broadcasts the advertising packet including the information of the terminal.

Figure 6:
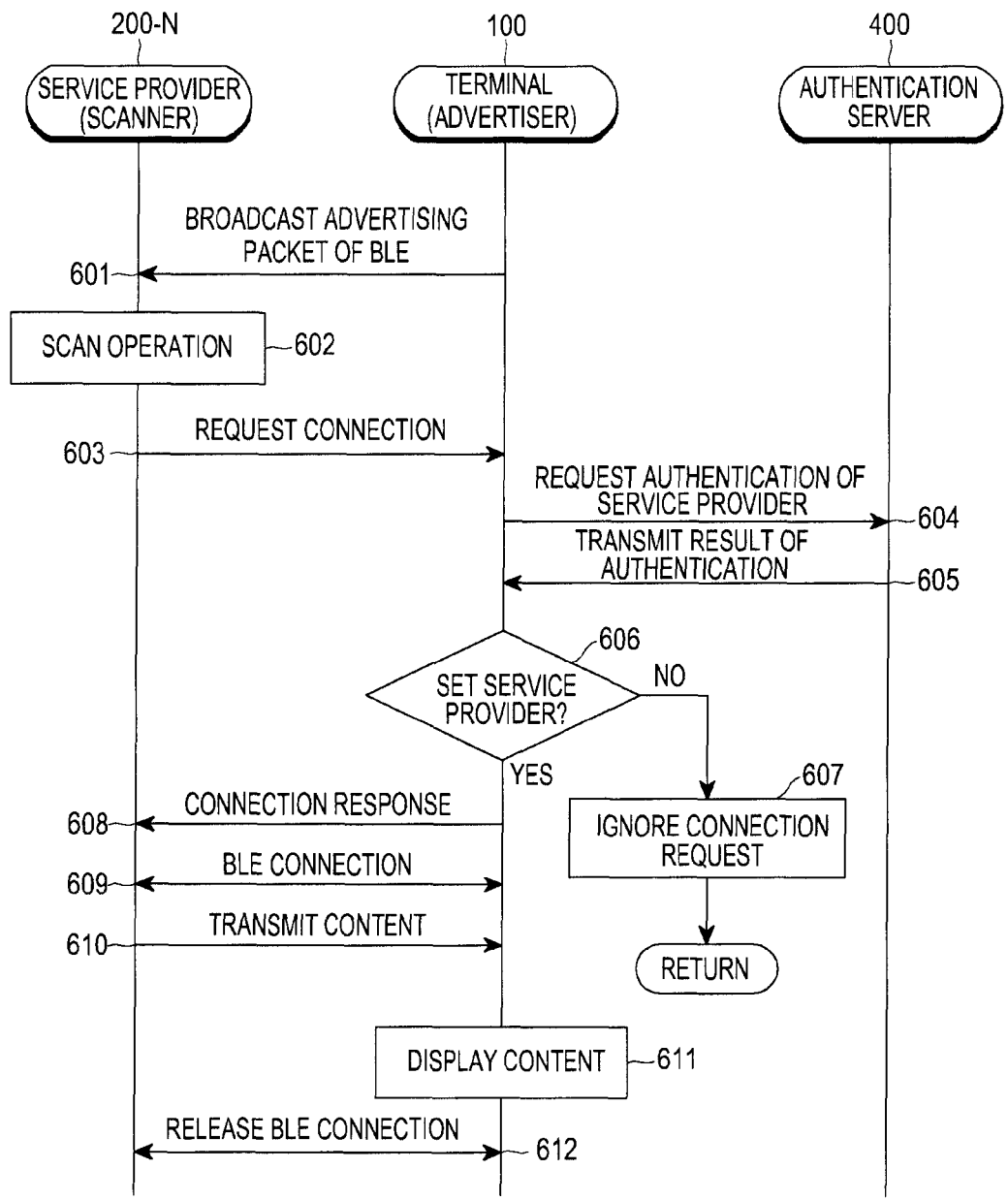
FIG. 6 is a flowchart showing exemplary operation of a process for receiving content by a terminal, according to a third exemplary embodiment of the present invention.

FIG. 6 is a flowchart showing an exemplary operational process for receiving content by a terminal, according to a third exemplary embodiment of the present invention.

Hereinafter, an exemplary embodiment of the present invention will be described in detail with reference to FIG. 1 and FIG. 2.

Referring now to FIG. 6, at step 601 the controller 110 of the terminal 100 continuously broadcasts at regular intervals an advertising packet of the BLE device including information of the terminal through the BLE device 170.

When a particular service provider 200-N from among the multiple service providers 200-1, 200-2, 200-N, etc. scans the advertising packet broadcasted by the terminal 100 while it performs a scan operation in step 602, the particular service provider 200-N proceeds to step 603, in which it sends a request for a BLE connection to the terminal 100.

When the terminal 100 receives the connection request from the particular service provider 200-N, the controller 110 of the terminal 100 proceeds to step 604, in which it transmits an address of the particular service provider 200-N to an authentication server 400 and simultaneously requests the authentication server 400 to authenticate the particular service provider 200-N. The address of the particular service provider 200-N transmitted to the authentication server 400 may be the random device address or the public device address.

Then, in step 605, the terminal 100 receives a result of the authentication transmitted by the authentication server 400.

When the result of the authentication shows that the address of the particular service provider 200-N is not an authenticated address, the controller 110 determines at step 606 that the address of the particular service provider 200-N is not an authenticated address, and performs step 607 by ignoring the connection request from the particular service provider 200-N.

However, when the result of the authentication shows that the address of the particular service provider 200-N is an authenticated address, the particular service provider 200-N determines in step 606, that the address of the particular service provider 200-N is an authenticated address, and then performs step 608, in which it responds to the connection request from the particular service provider 200-N.

According to the response of the terminal 100 to the connection request, the particular service provider 200-N and the terminal 100 perform step 609, in which BLE communication is connected between the particular service provider 200-N and the terminal 100.

When the BLE communication is connected between the particular service provider 200-N and the terminal 100 before a data channel is established, then at step 610 the particular service provider 200-N transmits content to the terminal 100. Then, the terminal performs step 611, in which it displays the received content according to a user's setting.

When the terminal 100 receives the content, the particular service provider 200-N and the terminal 100 perform step 612, in which the particular service provider 200-N and the terminal 100 release the BLE connection there between.

The controller 110 of the terminal 100 which has released the BLE connection between the terminal 100 and the particular service provider 200-N, then again performs step 601 by again broadcasting the advertising packet including the information of the terminal.

In an exemplary embodiment of the present invention, the terminal is described as comprising an advertiser which broadcasts an advertising packet including the information of the terminal. However, the terminal may comprise a scanner which scans the advertising packet.

Accordingly, functions such as remote control, file transmission, missing child prevention and child monitoring, may be performed through BLE communication between a terminal and another terminal. Also, a terminal may receive an advertisement, public relations, a coupon, menu offering, order and target marketing, through BLE communication between a terminal and an AP. Otherwise, functions such as personalized (profiling) service offering and remote control, may be performed, through BLE communication between a terminal and a TV, a PC or a tablet.

The above-described methods according to the present invention can be implemented in hardware, firmware or via the execution of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

The terms "unit" or "module" as may be used herein is to be understood as constituting hardware such as a processor or microprocessor configured for a certain desired functionality in accordance with statutory subject matter under 35 U.S.C. §101 and does not constitute software per se. The apparatus and the method for receiving content in the terminal according to the present invention may be implemented by using a computer-readable code in a computer-readable recording medium that is loaded into hardware such as a processor or microprocessor and executed. The computer-readable recording mediums are non-transitory mediums including all types of recording devices which may be read by a computer system and on which data are stored. Examples of the recording mediums include a ROM (Read Only Memory), a RAM (Random Access Memory), an optical disc, a magnetic tape, a floppy disk, a hard disc, a non-volatile memory, etc., and may also include things implemented in the form of carrier wave (e.g. transmission through the Internet). Also, the computer-readable recording mediums are distributed in a computer system connected to a network, so that computer-readable codes may be stored in the distributed storage mediums and be executed by hardware in a distributed scheme.

The present invention provides the apparatus and the method for receiving content in the terminal, and has an effect in that the terminal can continuously broadcast an advertising packet including the information of the terminal by using a low-power wireless communication technology and can receive various contents from adjacent service providers while consumption of current by the terminal can be reduced. Also, the present invention has an effect in that the terminal can receive content through only a local connection without a central server in a particular area, or can receive content from a particular fixed device, a particular mobile device or the like.

Although the present invention has been described with reference to the exemplary embodiments as shown in the accompanying drawings, the exemplary embodiments are only illustrative embodiments. It will be understood by those having ordinary knowledge in the technical field of the present invention that various modifications and other equivalent embodiments can be made from these exemplary embodiments that are within the spirit of the invention and scope of the appended claims. For example, while "BLE" is used in the description and drawings, the claimed invention can be practiced without the use of Bluetooth. Therefore, the real technical protection scope of the present invention should be defined by the technical idea of the attached claims.

What is claimed is:

1. A terminal comprising:
a low-power short-range communication unit having a transceiver; and
a controller configured to:
control the low-power short-range communication unit to broadcast an advertising packet including information of the terminal at regular intervals;
control the low-power short-range communication unit to provide a connection to a particular service provider which has scanned the advertising packet and requested connection with the terminal,
receive content from the particular service provider, and
display the received content according to a user's setting.

2. The terminal as claimed in claim 1, wherein the low-power short-range communication unit comprises a Bluetooth wireless transceiver.

3. The terminal as claimed in claim 1, wherein the information of the terminal included in the advertising packet comprises address information and status information of the terminal.

4. The terminal as claimed in claim 1, wherein the controller controls the low-power short-range communication unit (170) to broadcast the advertising packet at regular intervals equal to or greater than a threshold period when the terminal is in a sleep state, and controls the low-power short-range communication unit to broadcast the advertising packet at regular intervals less than the threshold period when the terminal is in motion.

5. The terminal as claimed in claim 1, wherein the content received from the particular service provider is in a form of a message comprising at least one of:
text;
multimedia data;
URL information; and
a command for performing a particular instruction.

6. The terminal as claimed in claim 1, wherein the controller performs a control operation to release the connection to the particular service provider after the content is received from the particular service provider, and controls the low-power short-range communication unit to broadcast the advertising packet including the information of the terminal at regular intervals.

7. A system for receiving content comprising the terminal of claim 1, and further comprising one or more service providers, wherein the particular service provider includes a service provider low-power short-range communication unit for requesting connection to the terminal when the particular service provider scans the advertising packet broadcasted by the terminal, and connects to the terminal through the service provider low-power short-range communication unit being in communication with the low-power communication unit of the terminal, and transmits the content to the terminal when the particular service provider receives a connection response from the terminal.

8. A system for receiving content comprising the terminal of claim 1, and further comprising one or more service providers, wherein the particular service provider includes a service provider low-power short-range communication unit to request an authentication server to authenticate the terminal when the particular service provider scans the advertising packet broadcasted by the terminal, requests connection of the particular service provider with the terminal when the authentication server completes the authentication of the terminal, and connects to the terminal through the service provider low-power short-range communication unit being in communication with the low-power communication unit of the terminal and transmits the content to the terminal when the particular service provider receives a connection response from the terminal.

9. The system as claimed in claim 8, wherein a random device address or a public device address of the terminal is transmitted to the authentication server, and the authentication server is requested to authenticate the terminal.

10. A terminal comprising:
a low-power short-range communication unit having a transceiver; and
a controller configured to:
control the low-power short-range communication unit to broadcast an advertising packet including information of the terminal at regular intervals;
control the low-power short-range communication unit to provide a connection to a particular service provider which has scanned the advertising packet and requested connection with the terminal, and
receive content from the particular service provider,
wherein, when the controller determines that the particular service provider is an authenticated service provider and the particular service provider requests a connection between the particular service provider and the terminal, the controller performs a control operation to transmit a connection response to the particular service provider, controls the low-power short-range communication unit to connect to the particular service provider, and performs a control operation to receive and display the content received from the particular service provider.

11. The terminal as claimed in claim 10, wherein the controller determines whether the particular service provider is the authenticated service provider, when a random device address of the particular service provider is included in an address list, in which service providers having authenticated random device addresses are recorded, when the random device address of the particular service provider is received together with a connection request from the particular service provider.

12. The terminal as claimed in claim 10, wherein the controller determines whether the particular service provider comprises an the authenticated service provider, when a public device address of the particular service provider is included in an address list, in which service providers having authenticated public device addresses are recorded, when the public device address of the particular service provider is received together with a connection request from the particular service provider.

13. The terminal as claimed in claim 10, wherein the controller requests an authentication server to authenticate the particular service provider when a connection request is received from the particular service provider, and the controller determines whether the particular service provider is the authenticated service provider when the authentication server completes the authentication of the particular service provider.

14. The terminal as claimed in claim 13, wherein the controller performs a control operation to transmit a random device address or a public device address of the particular service provider to the authentication server, and requests the authentication server to authenticate the particular service provider.

15. The terminal as claimed in claim 10, wherein the controller ignores a connection request made by the particular service provider when the particular service provider is not authenticated.

16. A method for receiving content in a terminal, the method comprising:
    broadcasting an advertising packet at regular intervals including information of the terminal by a low-power short-range communication unit;
    receiving content from a particular service provider when a connection to the particular service provider which has scanned the advertising packet broadcast from the terminal is made by the low-power short-range communication unit, and
    displaying the received content according to a user's setting.

17. The method as claimed in claim 16, wherein the low-power short-range communication unit comprises a Bluetooth transceiver.

18. The method as claimed in claim 16, wherein the information of the terminal included in the advertising packet comprises address information and status information of the terminal.

19. The method as claimed in claim 16, wherein broadcasting the advertising packet comprises:
    broadcasting the advertising packet at regular intervals equal to or greater than a predetermined threshold when the terminal is in a sleep state; and
    broadcasting the advertising packet at regular intervals less than the predetermined threshold when the terminal is in a moving state.

20. The method as claimed in claim 16, wherein the content received from the particular service provider comprises at least one of:
    text;
    multimedia data;
    URL information; and
    a command for performing a particular instruction.

21. The method as claimed in claim 16, further comprising:
    releasing by the terminal the connection to the particular service provider after receiving the content from the particular service provider; and
    continuously broadcasting by the low-power short-range communication unit of the terminal the advertising packet including the information of the terminal.

22. The method as claimed in claim 16, further comprising:
    requesting by the particular service provider, a connection to the terminal, via a service provider low-power short-range communication unit of the particular service provider in communication with the low-power communication unit of the terminal, when the particular service provider scans the advertising packet broadcasted by the terminal; and
    connecting the particular service provider to the terminal and transmitting the content to the terminal by the particular service provider, when the particular service provider receives a connection response from the terminal.

23. The method as claimed in claim 16, further comprising:
    requesting an authentication server to authenticate the terminal by the particular service provider via a service provider low-power short-range communication unit, when the particular service provider scans the advertising packet broadcasted by the terminal;
    requesting the terminal to connect to the particular service provider by the particular service provider, when the authentication server completes the authentication of the terminal; and
    connecting to the terminal through the connection of the service provider low-power short-range communication unit of the particular service provider with the low-power short range communication unit of the terminal, and transmitting the content to the terminal by the particular service provider, when the particular service provider receives a connection response from the terminal.

24. The method as claimed in claim 23, wherein a random device address or a public device address of the terminal is transmitted to the authentication server, and the authentication server is requested to authenticate the terminal.

25. A method for receiving content in a terminal, the method comprising:
    broadcasting an advertising packet at regular intervals including information of the terminal by a low-power short-range communication unit;
    receiving content from a particular service provider when a connection to the particular service provider which has scanned the advertising packet broadcast from the terminal is made by the low-power short-range communication unit;
    identifying, by a controller, whether the particular service provider comprises an authenticated service provider, when the particular service provider requests a connection between the particular service provider and the terminal; and
    transmitting a connection response to the particular service provider and connecting to the particular service provider by the low-power short-range communication unit, when the controller determines that the particular service provider is the authenticated service provider.

26. The method as claimed in claim 25, wherein identifying whether the particular service provider is the authenticated service provider comprises:
    determining by the controller whether a random device address of the particular service provider is included in an address list, in which service providers having authenticated random device addresses are recorded, when the random device address of the particular service provider is received together with a connection request from the particular service provider; and
    identifying that the particular service provider is the authenticated service provider, when the random device address of the particular service provider is included in the address list.

27. The method as claimed in claim 25, wherein identifying whether the particular service provider is the authenticated service provider comprises:
    determining by the controller whether a public device address of the particular service provider is included in an address list, in which service providers having authenticated public device addresses are recorded, when the public device address of the particular service provider is received together with a connection request from the particular service provider; and identifying that the particular service provider is the authenticated service provider, when the public device address of the particular service provider is included in the address list.

28. The method as claimed in claim 25, wherein identifying whether the particular service provider is the authenticated service provider comprises:
requesting an authentication server via a service provider low-power communication unit 200a or an RF unit to authenticate the particular service provider when a connection request is received from the particular service provider; and
identifying that the particular service provider is the authenticated service provider, when the authentication server completes the authentication of the particular service provider.

29. The method as claimed in claim 28, wherein a random device address or a public device address of the particular service provider is transmitted to the authentication server, and the authentication server is transmitted a request to authenticate the particular service provider.

30. The method as claimed in claim 25, further comprising ignoring a connection request made by the particular service provider after determining that the particular service provider is the authenticated service provider.

* * * * *